United States Patent [19]

Gilroy

[11] 4,309,252
[45] Jan. 5, 1982

[54] NUCLEAR REACTOR CONSTRUCTIONS
[75] Inventor: John E. Gilroy, Droylsden, England
[73] Assignee: Nuclear Power Company Limited, London, England
[21] Appl. No.: 70,434
[22] Filed: Aug. 28, 1979
[30] Foreign Application Priority Data Sep. 25, 1978 [GB] United Kingdom ............... 38071/78

[51] Int. Cl.³ ...................... G21C 11/00; G21C 15/00
[52] U.S. Cl. ..................................... 376/290; 376/460
[58] Field of Search ...................... 176/40, 87, 62–64, 176/61, 38

[56] References Cited

U.S. PATENT DOCUMENTS

| | | | |
|---|---|---|---|
| 2,990,349 | 6/1961 | Roman | 176/61 |
| 3,285,824 | 11/1966 | Ageron | 176/63 |
| 3,518,163 | 6/1970 | Boisblanc | 176/40 |
| 3,801,448 | 4/1974 | Brandstetter et al. | 176/40 |
| 3,816,245 | 6/1974 | Bevilacqua | 176/87 |
| 4,043,866 | 8/1977 | Durston | 176/62 |
| 4,050,986 | 9/1977 | Ference et al. | 176/40 |
| 4,053,358 | 10/1977 | Pennell | 176/87 |
| 4,064,000 | 12/1977 | Andrea | 176/35 |

FOREIGN PATENT DOCUMENTS 1497755  1/1978  United Kingdom .

Primary Examiner—Harvey E. Behrend
Attorney, Agent, or Firm—Larson and Taylor

[57] ABSTRACT

A liquid metal cooled fast breeder nuclear reactor comprising a nuclear fuel assembly submerged in a pool of coolant contained in a primary vessel is housed in a concrete vault. A core cover structure suspended from the roof of the vault and immersed in the pool of coolant comprises a plurality of vertical tubes braced apart by perforated grid plates. An intermediate grid plate has a permeable shroud which constrains coolant passing through the perforations in the grid plate to flow transversely over the upper surface to reduce the transient temperature differential.

2 Claims, 2 Drawing Figures

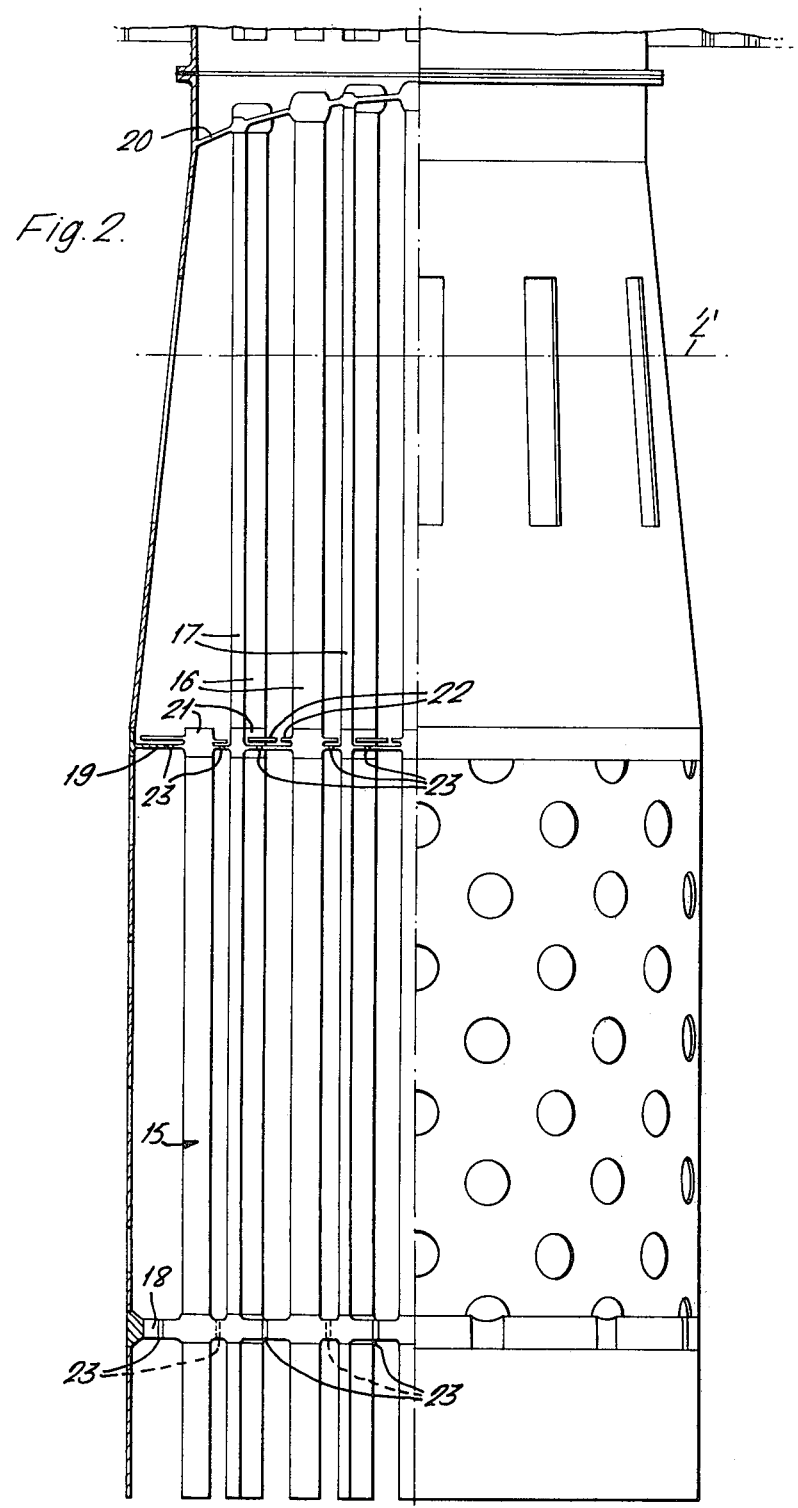

NUCLEAR REACTOR CONSTRUCTIONS

BACKGROUND OF THE INVENTION

This invention relates to nuclear reactor constructions of the kind comprising a nuclear fuel assembly submerged in a pool of coolant contained in a primary vessel and is primarily directed to liquid metal cooled fast breeder nuclear reactor constructions of that kind.

In a liquid metal cooled fast breeder nuclear reactor construction the fuel assembly is submerged in a pool of liquid metal coolant, for example, sodium, within a primary vessel which is housed within a concrete vault. The primary vessel is suspended from the roof of the vault and the roof has apertures for access to the primary vessel. One large access aperture is closed by a rotatable plug which carries apparatus for servicing the fuel assembly and other apertures are occupied by heat exchangers and pumps for effecting transfer of heat from the fuel assembly to external steam generating apparatus. The rotatable plug carries a core cover structure which comprises a generally cylindrical shell having lower and intermediate grid plates for tubes which serve to shroud the control rods and instrumentation connections. The core cover structure also provides a hold down facility for the fuel assembly in an emergency and the intermediate grid plate diverts coolant flowing upwardly from the fuel assembly into radial flow towards the heat exchanger inlet ports. During operation of the nuclear reactor the coolant leaving the fuel assembly is subject to rapid changes in temperature and to avoid thermal shock to the lower and intermediate grid plates (which are submerged in the pool of coolant) and the shell the grid plates and shell are perforated so that the coolant can flow freely in and about the structure and on both sides of the grid plates. However, the upper surface of the intermediate grid plate is submerged in a region of the pool of coolant which is relatively static and at a more constant temperature and therefore is more subject to thermal shock due to temperature differential across it. Thus one object of the invention is to reduce the temperature differential across the intermediate grid plate of the core cover structure and thereby reduce its subjection to thermal stresses.

SUMMARY OF THE INVENTION

According to the invention in a nuclear reactor construction having a nuclear fuel assembly submerged in a pool of coolant contained in a primary vessel there is a core cover structure comprising a group of vertically extending tubes braced apart by perforate lower and intermediate transverse grid plates which are submerged in the pool of coolant, the upper face of the intermediate grid plate having a permeable shroud whereby coolant flowing upwardly through the perforations in the intermediate grid plate is constrained to flow transversely over the upper surface of the grid plate. In use of the nuclear reactor, when the heat output of the fuel assembly is quickly reduced relatively cold coolant passes through the perforations in the intermediate grid plate and is constrained to flow transversely over the upper surface of the grid plate by the shroud and thereby quickly effect a fall in surface temperature to reduce inducement of thermal stresses in the intermediate grid plate.

In a preferred construction the permeable shroud is comprised of spaced rectilinear flanges of the tubes disposed in transverse planar array.

In a liquid metal cooled fast breeder nuclear reactor construction embodying the invention the core cover structure comprises a generally cylindrical perforate shell suspended from the roof of a containment vault with longitudinal axis vertical and a group of vertically extending tubes braced by perforate lower and intermediate grid plates which are submerged in the pool of coolant, the tubes having spaced rectilinear flanges disposed in transverse planar array to form a permeable shroud for the upper surface of the intermediate grid plate.

DESCRIPTION OF THE DRAWINGS

A liquid metal cooled fast breeder nuclear reactor construction embodying the invention is now described by way of example with reference to the accompanying drawings wherein:

FIG. 2 is a fragmentary elevation in medial section of a core cover plate structure for the reactor construction shown in FIG. 1 and drawn to a large scale.

DESCRIPTION OF THE PREFERRED EMBODIMENT

Figure 1:
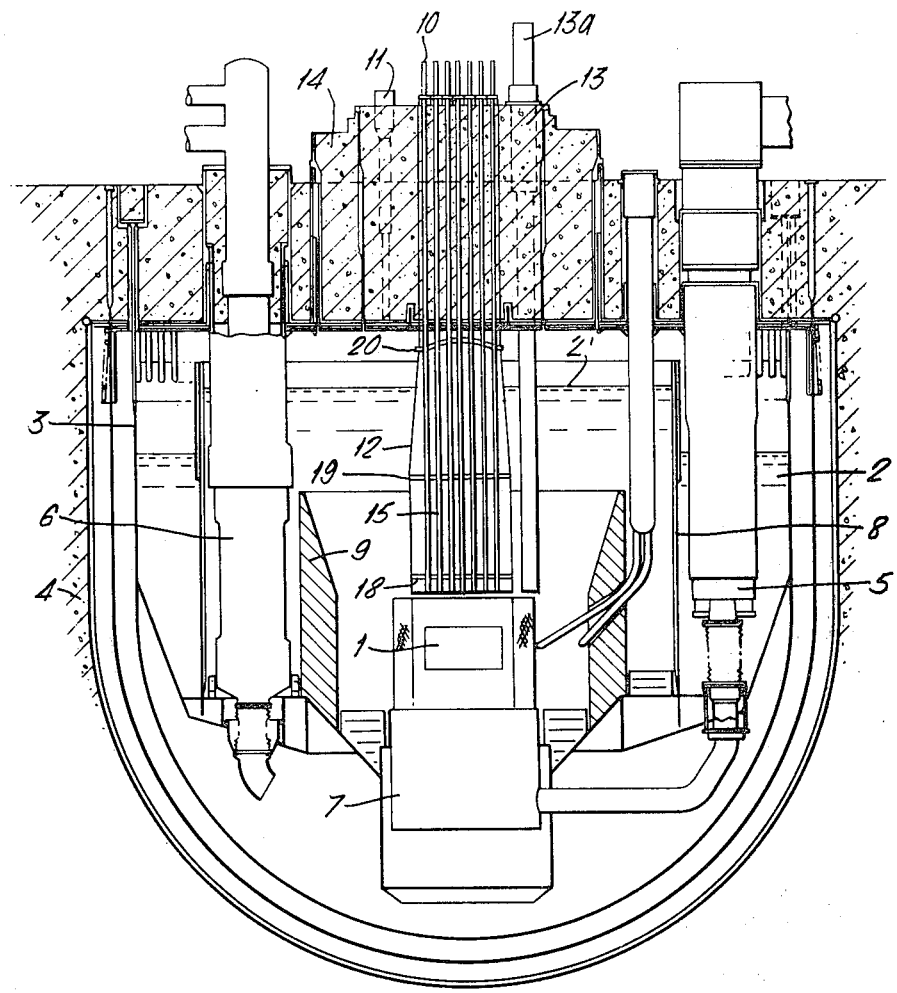
FIG. 1 is a sectional elevation.

FIG. 1 illustrates a nuclear reactor of the liquid metal cooled fast breeder kind having a fuel assembly 1 submerged in a pool 2 of liquid sodium coolant in a primary vessel 3. The primary vessel is suspended from the roof of a containment vault 4 and there is provided a plurality of coolant pumps 5 and heat exchangers 6 only one of each of the pumps and heat exchangers being shown. The fuel assembly 1 is mounted on a diagrid 7 and housed with the heat exchangers in a core tank 8 whilst the pumps, which deliver coolant to the diagrid, are disposed outside of the core tank. The core or fuel assembly 1 comprises a plurality of sub-assemblies which upstand from the diagrid in closely spaced side-by-side array and is surrounded by a neutron shield 9. Control rods 10 and instrumentation 11 are shown penetrating the roof of the vault and passing down towards the fuel assembly through a core cover structure 12. The core cover structure depends from a rotatable inner plug 13 which is mounted eccentrically in an outer plug 14 rotatable in an aperture in the roof of the vault. The plug 13 carries a fuelling machine 13a which, by rotation of the plugs 13, 14, can be arranged to command any fuelling position of the fuel assembly.

Referring now to FIG. 2 wherein the core cover structure 12 is shown in greater detail it is seen to comprise a generally cylindrical perforate structure disposed with its longitudinal axis vertical and immersed in the pool of coolant the level of which is designated 'L'. A plurality of tubes 15 serving as control rod shrouds 16 and instrumentation guides 17 extending vertically through the structure from immediately below the rotatable inner plug 13 to immediately above the fuel assembly 1 are braced by a lower grid plate 18, an intermediate grid plate 19 and a domed upper grid plate 20. The lower and intermediate grid plates 18, 19 have perforations 23 between the tubes and are both submerged in the pool of coolant. The intermediate grid plate 19 includes a plurality of bosses 21 to the ends of which segments of the tubes 15 are butt welded and the bosses are formed with thin hexagonal flanges 22 which are spaced apart and disposed in transverse planar array to form a permeable shroud for the upper surface of the intermediate grid plate 19.

In operation of the nuclear reactor relatively cold coolant drawn from the region of the pool which is outside of the core tank 8 is flowed upwardly through the fuel assembly 1 by the pumps 5 by way of the diagrid 7. The coolant flow impinging on the intermediate grid plate 19 of the core cover structure is diverted radially to flow into the heat exchangers through which it passes in heat exchange with a secondary liquid metal coolant associated with steam generating plant disposed externally of the vault. The primary liquid metal coolant is then returned to the pool. The core cover structure being perforate enables coolant to flow freely therethrough so that during stable operation of the reactor temperature differentials across the components of the structure are small. However, large changes of reactivity due to insertion of the control rods brings about a sudden large drop in heat energy produced from the reactor so that the outlet temperature of the reactor coolant falls substantially. As the lower grid plate 18 is perforate sufficient cold coolant can pass through and thereby quickly stabilise the temperature in the lower compartment (bounded by the lower and intermediate grid plates) of the core cover structure to avoid inducement of thermal stresses in the lower grid plate, but because the bulk of the coolant flow is directed away from the intermediate grid plate 19 there is a considerable delay in stabilisation of temperature between the upper and lower compartments of the core cover structure. However, the perforations in the intermediate grid plate enable relatively cold coolant in contact with the lower face to flow through to the upper surface where it is constrained to flow over the surface by the permeable shroud comprised of the array of flanges 22. Thus similar transient conditions are achieved on both surfaces of the relatively thick intermediate grid plate to minimise inducement of transient stresses. The flanges 22 being of relatively thin material because they are not subjected to the force of direct flow of coolant from the fuel assembly and being spaced apart provide a thin discontinuous membrane which can accept the transient stresses caused by the temperature transient.

I claim:

1. A liquid metal-cooled nuclear reactor of the pool kind comprising
    a primary vessel,
    a pool of liquid metal coolant contained in the primary vessel,
    a concrete vault housing the primary vessel and having an access port in the roof thereof, said access port being disposed directly above said nuclear fuel assembly,
    a closure plug for said access port, and
    a core cover structure suspended from said closure plug, said core cover structure comprising
    a perforate generally cylindrical vertical shell,
    a plurality of vertically extending parallel tubes, vertically spaced perforate transverse gridplates for bracing the tubes apart, at least the two lower most gridplates being submerged in the pool of coolant and a permeable shroud for the upper face of the uppermost of the submerged gridplates diposed to direct coolant flowing through the uppermost submerged gridplate over the upper surface thereof.

2. A nuclear reactor construction according to claim 1, wherein the permeable shroud is comprised of spaced rectilinear flanges of the tubes, the flanges being disposed in transverse planar array.

* * * * *